United States Patent [19]

Rossiter

[11] 4,446,094
[45] May 1, 1984

[54] APPARATUS AND METHOD FOR EXTRACTING FLUID FROM AN EXTRUDED MATERIAL

[75] Inventor: Paul H. Rossiter, Royersford, Pa.

[73] Assignee: Welding Engineers, Inc., King of Prussia, Pa.

[21] Appl. No.: 421,864

[22] Filed: Sep. 23, 1982

[51] Int. Cl.³ ............................................. B29F 3/03
[52] U.S. Cl. ......................................... 264/349; 34/12; 34/14; 100/93 S; 264/101; 366/75; 366/77; 366/85; 366/89; 425/203; 425/204
[58] Field of Search ................... 264/349; 159/2 E; 264/101, 102; 425/203, 204; 366/75, 77, 85, 89; 34/12, 14, 17; 100/93 S, 145

[56] References Cited

U.S. PATENT DOCUMENTS

| 2,833,750 | 5/1958 | Vickers | 264/102 |
|---|---|---|---|
| 3,035,306 | 5/1962 | Rossiter | 159/2 E |
| 3,067,462 | 12/1962 | Kullgren | 264/102 |
| 3,222,797 | 12/1965 | Zies | 159/2 E |
| 3,499,187 | 3/1970 | Cohen | 425/197 |
| 3,579,728 | 5/1971 | Reid et al. | 264/102 |
| 3,633,880 | 1/1972 | Newmark | 425/203 |
| 3,742,093 | 6/1973 | Skidmore | 264/349 |
| 3,874,090 | 4/1975 | McCracken | 159/2 E |
| 3,888,469 | 6/1975 | Geyer | 366/75 |
| 4,065,532 | 12/1977 | Wild et al. | 425/203 |

FOREIGN PATENT DOCUMENTS 52-14666  2/1977  Japan .................................. 264/102

*Primary Examiner*—Jeffery R. Thurlow
*Attorney, Agent, or Firm*—Austin R. Miller

[57] ABSTRACT

An apparatus and method for extracting water from rubber is provided. The rubber is screw conveyed in a twin screw extruder and alternately compressed between the forward side of the screw conveying threads, the inner extruder chamber wall and the wedge-shaped screw shaft. Water is squeezed out of the compressed rubber particles and drained off. The extruder chamber wall preferably has longitudinal grooves to impede the revolving movement of the rubber particles and to further squeeze the water from the rubber particles.

12 Claims, 3 Drawing Figures

4,446,094

APPARATUS AND METHOD FOR EXTRACTING FLUID FROM AN EXTRUDED MATERIAL

BACKGROUND OF THE INVENTION

The present invention relates to an apparatus and method for extracting a fluid from an elastomer, and more specifically relates to such an apparatus and method for extracting water from an elastomer such as a rubber.

The apparatus preferably includes a twin screw conveying means for conveying and compressing the elastomer to remove water therefrom. The apparatus and method are particularly useful in reducing the water content of an elastomer from as high as about 65 wt. % water to a dewatered water content of less than 10 wt. % water.

DESCRIPTION OF THE PRIOR ART

Extrusion screws are well-known in the extrusion arts and are known to be effective for working and mixing thermoplastic materials before being extruded through a die plate.

Furthermore extrusion screws, having a shaft with shaft areas between consecutive conveying threads, each shaft area being individually sloped towards the axis of the screw shaft in the direction of the forward movement of the thermoplastic material, is known in the art and such a system is described in U.S. Pat. No. 3,499,187 to Cohen. This Patent discloses that such a conveying screw shaft, having sections of larger diameter and sections of smaller diameter provides better working and mixing of the thermoplastic material enabling it to be conveyed in a pasty and homogenous state towards the die plate.

There has been a need in the rubber drying art for an energy efficient apparatus and method of drying rubbers and other elastomers having a high water content, for example 65 wt. % water, to water contents of less than about 10 wt. %.

OBJECTS OF THE INVENTION

Thus, it is an important object of the present invention to provide an apparatus and method for extracting fluid from a fluid-containing elastomer.

It is another important object of the present invention to provide an apparatus and method for extracting water from a water-containing elastomer such as a spongy rubber.

It is a further important object of the invention to provide an energy efficient apparatus and method for removing fluids from elastomers and especially for removing water from rubber.

SUMMARY OF THE INVENTION

An apparatus and method for extracting a fluid from an elastomer, such as water from a rubber, in accordance with this invention includes screw conveying the elastomer in a cylindrical chamber, compressing the elastomer between the forward side of the conveying screw threads, the cylindrical chamber wall and the wedge shaped screw shaft, conveying away released fluid from the compressed elastomer and providing a cylindrical wall surface which impedes the revolving movement of the elastomer.

The apparatus for extracting liquid from an elastomer may be of either single or twin screw construction. A preferred method and apparatus of the present invention involves a twin screw extruder configuration wherein the elastomer is alternately compressed in the space between the wedge shaped screw shaft, the extruder barrel wall and the forward side of the conveying screw threads, and released from its state of compression by depositing it in an apex area between the two screws. After being deposited in the apex area, the elastomer is then picked up by the second screw and undergoes compression. In this way, the elastomer is worked by alternately compressing and releasing the elastomer particles.

In a preferred embodiment of the present invention the step of impeding the revolving movement of the elastomer particles as they are conveyed by the rotating screw is accomplished by providing longitudinal grooves running along the length of the extruder barrel wall. Of course in a twin screw design the cross-section of the chamber will be roughly in the shape of a figure 8 rather than the circular cross-section of a single screw cylindrical chamber. In the case of a twin screw apparatus, the longitudinal grooves are provided along the walls of the figure 8.

Figure 1:
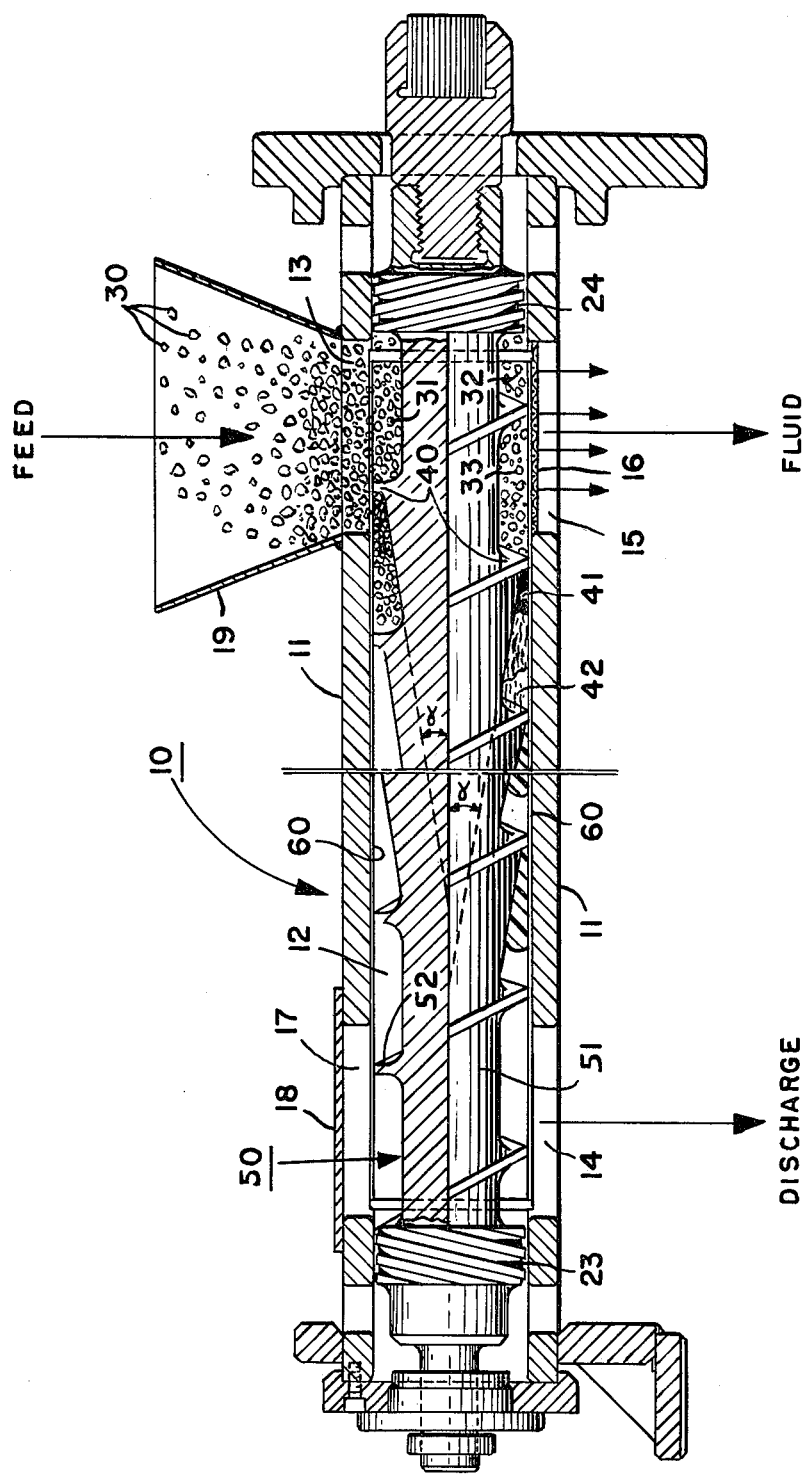
FIG. 1 is a side sectional view of a fluid extracting apparatus comprising one specific embodiment of the present invention.

Although specific forms of apparatus embodying the invention have been selected for illustration in the drawings, and although specific method steps embodying the invention have been selected for description and although specific terminology will be resorted to in describing those forms in the specification which follows, their use is not intended to define or to limit the scope of the invention, which is defined in the appended claims.

DESCRIPTION OF THE PREFERRED EMBODIMENTS

Referring generally to the figures, the liquid extraction apparatus is generally referred to as 10. Referring specifically to FIG. 1, liquid extraction apparatus 10 comprises housing 11 enclosing a chamber 12. Housing 11 has an inlet port 13 to which is attached a hopper 19 through which the incoming rubber particles 30 are fed. Located below inlet port 13 at the inlet end of the fluid extraction apparatus 10 is a drain opening 15 having a screen 16 disposed therein. Thus, any free water which is fed into the liquid extraction apparatus 10 is immediately drained off through screen 16 and drain opening 15. Housing 11 also has an inspection port 17 with a transparent covering 18 thereover, and a discharge port 14 through which the dried rubber and extracted free water are discharged from the liquid extraction apparatus 10. Rotatably mounted within chamber 12 is screw 50 comprising a screw shaft 51 and threading 52. Screw 50 forms a seal with the ends of housing 11 using conventional sealing means 23, 24.

Rotating screw 50 is driven by conventional means (not shown). With the apparatus shown it is possible to utilize an efficient high speed pump yielding higher capacities with small machines. The pump speed controls are important and should be infinitely variable in order to match screw rotational speed with the geometry of the screw spacings and the type of apparatus used (for example, single or twin screw).

In the operation of liquid extraction apparatus 10, rubber particles 30, having a water content of about 65 wt. %, are fed into hopper 19 and begin to fill up the spaces 31, 32 and 33 between screw 50 and the inside wall of housing 11. The screw shaft 51 has a substantially uniform and reduced diameter adjacent spaces 31, 32 and 33. Thus, as the rubber particles 30 are conveyed along this section of screw 50 there is little compression of the rubber particles 30.

Downstream of thread 40 however, the shape of shaft 51 changes. As can be seen in FIG. 1, the angled surface of shaft 51 together with threads 40 and the inside wall of housing 11 form a wedge shape into which the rubber particles 30 are compressed as they are conveyed through liquid extraction apparatus 10.

The outer surface of shaft 51 typically forms an angle $\alpha$ in the forward conveying direction with the axis of screw 50. Angle $\alpha$ is typically in the range from about 5° to about 15°. In the case of dewatering rubber particles, $\alpha$ is preferably about 10°.

As the rubber particles 30 are conveyed downstream from thread 40 they are wedged and compressed into space 41 thereby squeezing out the liquid held by the rubber particles 30. This extracted liquid then runs into adjacent space 42.

Grooves 60 are provided in the inside wall of housing 11 and run longitudinally along the length of housing 11. Grooves 60 present a "washboard" surface over which the rubber particles 30 are conveyed. Such a grooved surface aids in the compression of the rubber particles 30 to extract even more liquid therefrom.

As screw 50 rotates, the rubber particles 30 are transported along the length of the fluid extraction apparatus 10 in a compressed manner and separate from the extracted liquid.

As the material is conveyed to the discharge end of the fluid extraction apparatus 10, the diameter of shaft 51 again becomes uniform and reduced in size and the rubber particles 30 together with the free extracted water are discharged through port 14. The extracted water and the compressed rubber are typically discharged onto a shaker screen from which the free water is removed. In the operation of the above-described apparatus, the rubber leaving the discharge port 14 typically has a water content of up to about 10 wt. %.

Figure 2:
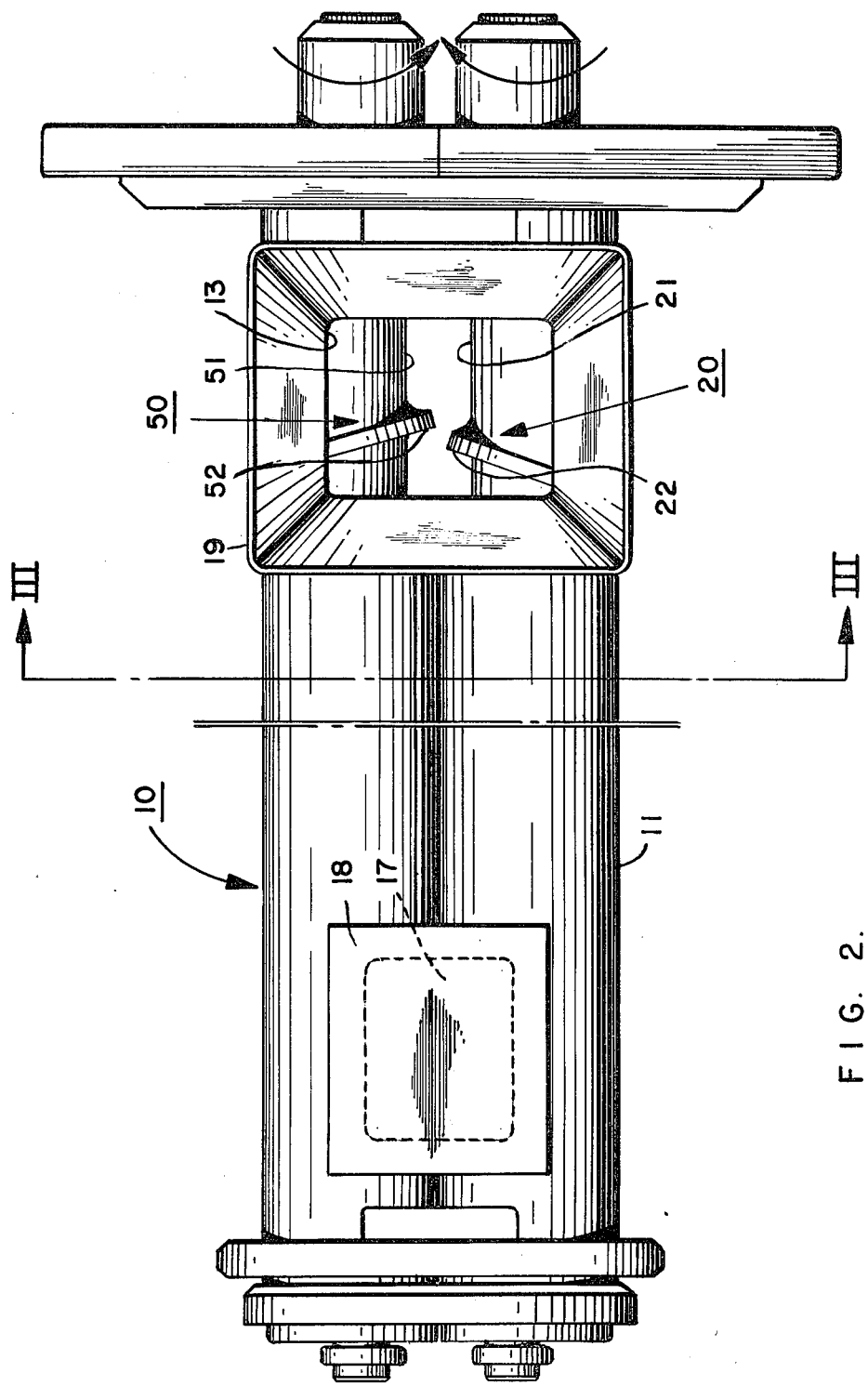
FIG. 2 is a top view of a fluid extraction apparatus similar to the one shown in FIG. 1, with a second screw illustrating the twin screw embodiment.

Referring now to FIG. 2, one can see that the liquid extraction apparatus 10 has a twin screw design. Inlet port 13 reveals the two screws 20, 50 in parallel alignment, each screw having a shaft 21, 51 and threading 22, 52 respectively. Threading 22 and 52 are of opposite hand.

Also shown in FIG. 2 is the inspection port 17 with transparent covering 18 enabling an operator to view the discharge of the rubber particles 30.

Figure 3:
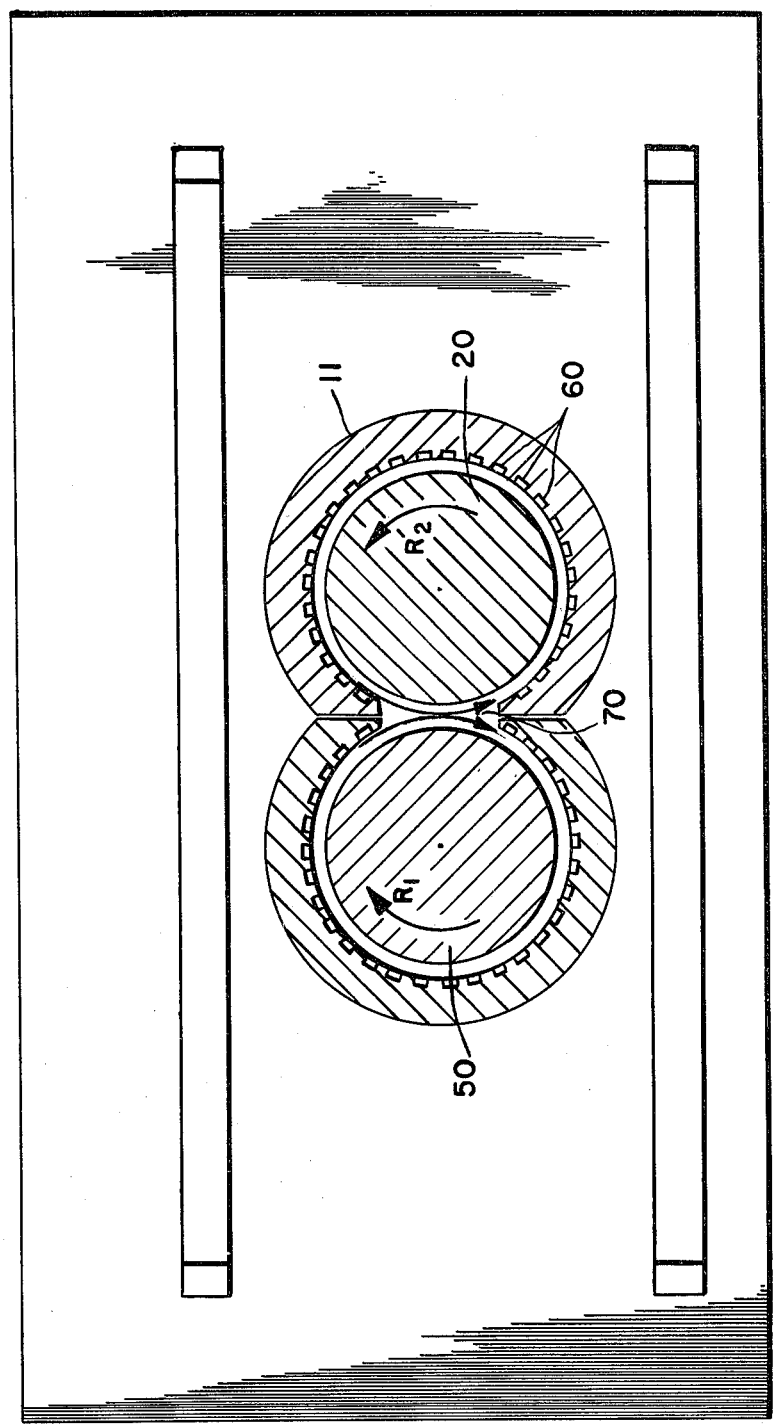
FIG. 3 is a sectional view toward the inlet end of the fluid extraction apparatus shown in FIG. 2 taken along III—III.

FIG. 3 is a cross-sectional view of the apparatus shown in FIGS. 1 and 2, taken along line III-III in FIG. 2, looking toward the inlet end of liquid extraction apparatus 10. As can be seen, housing 11 has a figure 8-shaped cross-section to accommodate the two screws 20, 50.

As can be seen from arrows $R_1$ and $R_2$, screw 20 rotates in a counter-clockwise direction while screw 50 rotates in a clockwise direction.

Grooves 60 are clearly shown in the interior walls of housing 11. Grooves 60 run longitudinally along the length of housing 11 and provide a type of washboard effect for impeding the conveyance of the rubber particles 30 through the housing 11. Grooves 60 together with the screw conveying action of screws 20, 50 provides increased compression of the rubber particles 30 and helps extract even more liquid therefrom.

Between screws 20, 50 is an apex area 70 into which the compressed rubber particles 30 are periodically deposited during the rotation of screws 20, 50. Apex area 70 provides a region of reduced compression compared with the wedging and compressing action of the screws 20, 50 during the remaining portion of their rotations. Thus, the rubber particles 30 are subjected to alternating compression and release, with the release being provided during the residence time of the particles 30 in apex area 70. Eventually, the particles 30 are picked up by the screw threads and removed from apex area 70 as shown by the arrows and fed into the wedged and compressing narrow gaps between the screws 20, 50 and the inside wall of housing 11 having longitudinal grooves 60.

Although only the twin screw type of liquid extraction apparatus is described in the specification and drawings, it will be appreciated by those skilled in the art that the same principles can be applied to an apparatus and method utilizing only a single screw. For instance, such an apparatus could have a cylindrically shaped housing with grooves 60 running completely therearound. In such a single screw apparatus, the alternating compression and release of the elastomer particles would not be achieved.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and scope of this invention as defined in the appended claims.

We claim:

1. An apparatus for extracting a liquid from an elastomer comprising:
  a. twin screw conveying means for screw conveying the elastomer in two side-by-side chambers in a revolving or figure-eight and forward direction;
  b. means for alternately, with each rotation of the twin screw conveying means:
    (i) wedging and compressing the elastomer between a forward face of a screw conveying thread, a screw shaft and a chamber wall; and
    (ii) releasing the wedged and compressed elastomer;
  c. means for conveying released fluid away from the wedged and compressed elastomer; and
  d. means for impeding the revolving movement of the elastomer.

2. The apparatus as described in claim 1, wherein said elastomer is a rubber.

3. The apparatus as described in claim 1, wherein said fluid is water.

4. The apparatus as described in claim 1, wherein the cylindrical chambers are a twin screw extruder barrel.

5. The apparatus as described in claim 1, wherein the screw shaft has a plurality of shaft areas, each shaft area being located between two consecutive threads, wherein the shaft areas are sloped toward the axis of the screw shaft in the forward direction.

6. The apparatus as described in claim 1, wherein the means (d) comprises the wall of the cylindrical chamber having longitudinal grooves therein.

7. A method for extracting a liquid from an elastomer comprising:
   a. twin screw conveying the elastomer in two side-by-side chambers in a revolving or figure-8 and forward direction;
   b. alternately, with each rotation of the twin screw conveying means:
      (i) wedging and compressing the elastomer between a forward face of a screw conveying thread, a screw shaft and a chamber wall; and
      (ii) releasing the wedged and compressed elastomer;
   c. conveying released fluid away from the wedged and compressed elastomer; and
   d. impeding the revolving movement of the elastomer.

8. The method as described in claim 7, wherein said elastomer is a rubber.

9. The method as described in claim 7, wherein said fluid is water.

10. The method as described in claim 7, wherein said chambers are a twin screw extruder barrel.

11. The method as described in claim 7, wherein the screw shaft has a plurality of shaft areas, each shaft area being located between two consecutive threads, wherein the shaft areas are sloped toward the axis of the screw shaft in the forward direction.

12. The method as described in claim 7, wherein step (d) comprises providing longitudinal grooves in the cylindrical chamber walls.

* * * * *